United States Patent Office 3,287,111
Patented Nov. 22, 1966

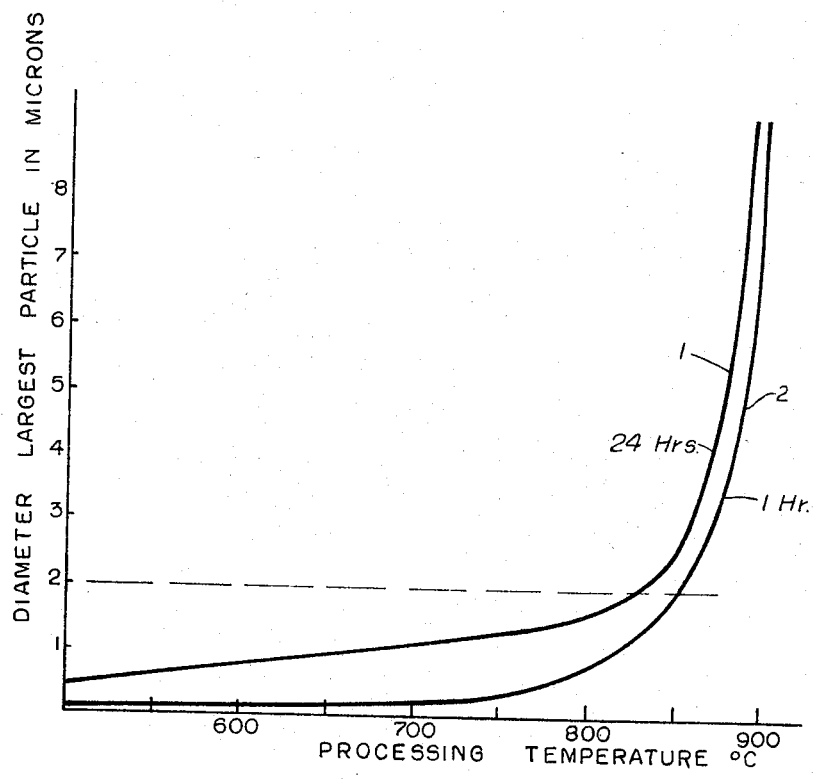

3,287,111
ZIRCONIUM BASE NUCLEAR REACTOR ALLOY
Harold H. Klepfer, Pleasanton, Calif., assignor to the United States of America as represented by the United States Atomic Energy Commission
Filed Oct. 14, 1965, Ser. No. 496,198
8 Claims. (Cl. 75—177)

This application is a continuation-in-part of U.S. application Serial No. 412,571, filed November 19, 1964, for a Zirconium Base Nuclear Reactor Alloy, and now abandoned. The invention described herein was made in the course of, or under Contract No. AT(04–3)–189, Project Agreement No. 24, with the United States Atomic Energy Commission.

This invention relates to alloys of zirconium and in particular to alloys having low neutron absorption properties together with unique low corrosion and hydrogen embrittlement properties in an atmosphere of water and/or steam between 300 and 500° C. as well as to methods employing such alloy in a high temperature steam nuclear reactor environment.

In nuclear reactors using water or steam as a coolant, small amounts of free hydrogen are present due to radiolytic dissociation of the water or steam when exposed to fast neutrons and gamma rays within the reactor and due to the corrosion reaction $Zr+2H_2O \rightarrow ZrO_2+4H_2$. The free hydrogen is readily absorbed by the prior art zirconium alloys so as to become brittle and unusable as a structural material such as cladding for nuclear fuel. For example, existing alloys of zirconium such as Zircaloy-2 containing 1.5 weight percent tin, 0.12 weight percent iron, 0.10 weight percent chromium and 0.05 weight percent nickel; Zircaloy-3 containing 0.25–0.50 weight percent tin, 0.25–0.10 weight percent iron and 0.20 weight percent nickel and Zircaloy-4 containing 1.2 to 1.7 weight percent tin, 0.18–0.20 weight percent iron, 0.07 to 0.13 weight percent chromium and 0.007 weight percent maximum nickel are thus limited in utility at elevated temperatures in a steam and/or boiling water environment due to hydrogen embrittlement.

Work on zirconium alloys of the prior art concentrated on increasing corrosion resistance with only secondary interest in hydrogen absorption or hydrogen embrittlement. The alloy of this invention is limited to a critical composition range of alloying elements and to critical fabrication treatments to provide a zirconium alloy having a low hydrogen absorption and low hydrogen embrittlement coupled with high corrosion resistance and good fabricability for use in a nuclear reactor operating in the temperature range between 300 and 500° C.

It is therefore an object of this invention to provide an alloy of zirconium having a low corrosion rate at temperatures of the order of 500° C. in steam and/or boiling water.

It is a further object of this invention to provide an alloy of zirconium having a low susceptibility to hydrogen embrittlement at elevated temperatures.

It is still a further object of this invention to provide an alloy of zirconium having a low rate of hydrogen absorption at elevated temperatures.

It is a further object of this invention to provide an alloy of zirconium requiring no greater degree of purity than reactor grade sponge zirconium currently commercially available to provide corrosion and hydrogen embrittlement resistant alloys.

It is another object of the invention to provide an alloy of zirconium wherein the cost of fabrication of the alloy is substantially the same as the cost of fabrication of existing alloys of zirconium.

It is still another object of this invention to provide an alloy of zirconium which is at least as strong as reactor grade zirconium derived from sponge zirconium metal.

It is a further object of this invention to provide an alloy of zirconium having a neutron absorption cross-section substantially the same as or less than existing alloys of zirconium currently used in nuclear reactors.

Another object of the invention is to provide a method of protecting fissile fuel in a high temperature steam nuclear reactor environment employing a zirconium alloy as cladding.

Other and more particular objects of this invention will be manifest upon study of the following detailed description. When taken together with the accompanying drawing, in which:

The figure is a graph of the change in intermetallic particle size when the alloy is exposed to temperature below 900° C.

The alloy of the present invention is distinguishable from alloys of the prior art, in that by addition of only small and critical amounts of chromium and iron within a narrow range of composition to reactor grade zirconium having only traces of other elements present, an alloy is produced having surprisingly low hydrogen absorption and embrittlement characteristics along with high corrosion resistance, high strength and good fabricability and in which the beneficial properties are developed to a superior degree by certain specified heat and working treatments.

In general, a study of corrosion and hydrogen absorption and embrittlement effects on zirconium indicate that the process is dependent upon the solid state properties of the zirconium oxide film formed on the surface of the metal. In addition, it has been determined that the composition of the oxide film is proportional to the alloy content of the metal. Thus the chemical, electrical and mechanical properties of the oxide film containing portions of the alloy elements determine the corrosion and hydrogen embrittlement characteristics of the alloy. For example, it has been found that small quantities of chromium and iron tend not only to increase plasticity of the surface oxides, but also tend to increase adherence of the oxide film to the metallic surface of the alloy. On the other hand, it has been found that yttrium tends to decrease plasticity of the oxide film resulting in early spalling of the film from the surface of the alloy exposing the bare metal to further corrosion and materials tending to cause hydrogen embrittlement.

Besides being dependent upon the solid state properties of the oxide film formed on the surface of the metal, the process is also dependent upon the thermal conductivity properties of this adhering insulating oxide coating in that its resistance to heat flow is generally high. In the case of a nuclear reactor the rate of heat flow may be of the order of 500,000 B.t.u./ft.²/hr. and where the outer surface of the film is operating at 300° C. in a boiling water or steam environment, the inner surface of the adhering insulating oxide film will be operating at a higher temperature depending upon film thickness. At this higher operating temperature, the alloy will tend to lose strength and increase its rate of hydrogen absorption. Where the alloys of the prior art all deal with corrosion at only one temperature the alloy of this invention takes cognizance of not only the rate of corrosion in the tempreature range between 300 and 500° C. but also the rate of acceleration of corrosion with increase in temperature. Alloys of the prior art undergo relatively rapid corrosion during early stages of use thus accelerating temperature-corrosion effects and aggravating the problem. Furthermore, the alloying elements are specifically selected in kind and amount to not only reduce the rate of hydrogen absorption but also to increase the amount of hydrogen necessary to cause embrittlement. Thus the alloy of this invention selectively controls not only corrosion rate but also the rate of temperature rise of the inner portions of the cladding incorporating the alloy with time, i.e., over a period of 2–4 years, rate of hydrogen absorption and the amount of hydrogen necessary to cause embrittlement.

It has been found through experimentation that the steady state corrosion rate for an alloy of zirconium containing one or more of the elements niobium, chromium, iron or copper can be expressed by the following polynomial equations.

At 500° C.:

$$\ln(y) = 1.392 + 0.802(\text{Nb}) - 0.212(\text{Cr}) + 1.026(\text{Fe})$$
$$- 0.77(\text{Cu}) - 0.327(\text{Nb})^2 - 0.047(\text{Cr})^2$$
$$- 1.084(\text{Fe})^2 + 0.182(\text{Cu})^2 + 0.264(\text{Cr})(\text{Cu})$$
$$- 0.125(\text{Fe})(\text{Cu})$$

At 400° C.:

$$\ln(y) = 0.539 + 1.050(\text{Nb}) - 0.217(\text{Cr}) + 0.065(\text{Fe})$$
$$- 0.419(\text{Cu}) - 0.535(\text{Nb})^2 - 0.043(\text{Cr})^2$$
$$- 2.137(\text{Fe})^2 - 0.217(\text{Cu})^2 + 0.042(\text{Nb})(\text{Cr})$$
$$+ 0.464(\text{Nb})(\text{Fe}) + 0.389(\text{Nb})(\text{Cu})$$
$$+ 0.417(\text{Cr})(\text{Fe}) + 0.023(\text{Cr})(\text{Cu})$$
$$+ 0.316(\text{Fe})(\text{Cu})$$

At 300° C.:

$$\ln(y) = -1.987 + 0.944(\text{Nb}) - 0.949(\text{Cr}) - 0.964(\text{Fe})$$
$$- 0.270(\text{Cu}) + 0.074(\text{Nb})^2 + 0.279(\text{Cr})^2$$
$$- 3.489(\text{Fe})^2 + 0.031(\text{Cu})^2 - 0.452(\text{Nb})(\text{Cr})$$
$$+ 0.378(\text{Nb})(\text{Fe}) - 0.425(\text{Nb})(\text{Cu})$$
$$+ 1.415(\text{Cr})(\text{Fe}) + 0.076(\text{Cr})(\text{Cu})$$
$$+ 0.800(\text{Cr})(\text{Fe})$$

where:

$y$ = Corrosion rate in mg./dm.$^2$/day
Nb = niobium content in atomic precent
Cr = chromium content in atomic percent
Fe = iron content in atomic percent
Cu = copper content in atomic percent It has been found that the addition of niobium is generally detrimental as far as corrosion resistance is concerned for all alloys containing chromium, copper or iron. Alloys containing Cu–Fe and Cr–Fe have generally good corrosion resistance at both 300 and 500° C. However, the presence of copper increases hydrogen up-take at 300° C.

It has also been found through experimentation that the steady-state hydrogen absorption rate for an alloy of zirconium containing one or more of the elements niobium, chromium, iron or copper can be expressed by the following polynomial equations.

At 500° C.:

$$\ln(h) = 1.835 - 0.115(\text{Nb}) - 0.060(\text{Cr}) - 0.368(\text{Fe})$$
$$- 1.097(\text{Cu}) - 0.097(\text{Nb})^2 - 0.148(\text{Cr})^2$$
$$+ 1.049(\text{Fe})^2 + 0.242(\text{Cu})^2 + 0.072(\text{Nb})(\text{Cr})$$
$$+ 0.043(\text{Nb})(\text{Fe}) + 0.069(\text{Nb})(\text{Cu})$$
$$- 0.160(\text{Cr})(\text{Fe}) + 0.634(\text{Cr})(\text{Cu})$$
$$- 0.619(\text{Fe})(\text{Cu})$$

At 400° C.:

$$\frac{\ln(h + \sqrt{h^2 + 0.2})}{2} = 0.777 + 0.815(\text{Nb}) - 1.108(\text{Cr})$$
$$+ 0.619(\text{Fe}) - 0.834(\text{Cr})$$
$$- 0.192(\text{Nb})^2 + 0.191(\text{Cr})^2$$
$$- 7.898(\text{Fe})_2 + 0.842(\text{Cr})^2$$
$$+ 0.015(\text{Nb})(\text{Cr}) + 1.157(\text{Nb})(\text{Fe})$$
$$- 0.048(\text{Cr})(\text{Cu}) - 0.432(\text{Fe})(\text{Cu})$$

where:

$h$ = hydrogen absorption rate in p.p.m./day
Nb = niobium content in atomic percent
Cr = chromium content in atomic percent
Fe = iron content in atomic percent
Cu = copper content in atomic percent For best results in increasing resistance to hydrogen embrittlement the combined Fe and Nb content should be kept below 0.7 atomic percent. Since niobium is generally not desirable, none is included in the alloy of the present invention having only iron which, for commercial reactor grade zirconium sponge runs approximately 0.1 atomic percent iron. Therefore, no increase in purity of presently available zirconium sponge is necessary.

Thus, the alloy of this invention is considered essentially to involve a zirconium-chromium-iron system.

The range of chromium content to produce an alloy of a strength greater than existing zirconium alloys and to still maintain good fabricability, high neutron economy, good resistance to hydrogen take-up and good ductibility is from 1.7 atomic percent to 2.3 atomic percent chromium.

The range of iron content necessary to maintain alloy strength, good resistance to hydrogen take-up, high neutron economy and good fabricability is from 0.1 to 0.2 atomic percent iron.

The optimum and preferred alloy is therefore zirconium with a content of about 2.0 atomic percent chromium and 0.16 atomic percent iron. Compared with the existing alloy Zircaloy-2, Table I illustrates the properties of the alloy of the present invention.

*Table I*

| Long Term | Zr+2.0 at. percent Cr+0.16 at. percent Fe | Zircaloy-2 |
|---|---|---|
| Corrosion rate in mg./dm.$^2$/day: | | |
| 500° C | 0.8 | 9.6 |
| 400° C | 0.28 | 1.36 |
| 300° C | 0.067 | 0.074 |
| Hydrogen Content in p.p.m.: | | |
| 500° C.: | | |
| After 3,000 hr | 227 | 1,563 |
| After 4,912 hr | 450 | 1,728 |
| 300° C.: | | |
| After 3,000 hr | 7 | 28 |
| After 6,570 hr | 9 | 34 |
| Yield Strength, kg./mm.$^2$ | 42 | 39 |
| Ultimate Tensile Strength, kg./mm.$^2$ | 55 | 48 |
| Percent Total Elongation | 15 | 22 |
| Percent Reduction in Area | 37 | 36 |

It is essential, in the practice of this invention, that certain time temperature parameters be very carefully adherred to during the fabrication and working of the alloy in order to obtain the best corrosion resistance and hydrogen absorption and embrittlement resistance properties.

The corrosion resistance characteristics of the alloy of this invention depend upon the structure of the oxide film on the exposed surface of the alloy, and it is therefore most essential that the chromium be finely divided and evenly dispersed throughout the alloy so that it will also be evenly dispersed throughout the oxide film. In effect, the oxide film must be "doped" with chromium in the proper form to effect the solid state properties, discussed supra, of the oxide film.

The chromium in the alloy of the present invention is known to be soluble in the body centered cubic beta phase of zirconium but insoluble in the hexagonal alpha phase. The excess insoluble chromium precipitates out as $ZrCr_2$. The transition zone between the alpha and beta phases was found to occur in the temperature range 800 to 900° C. The size of the $ZrCr_2$ precipitate particles, characterized more as an agglomerate, is determined by the length of time the alloy remains within this transition zone temperature range. The longer the alloy remains in this temperature range, the coarser the agglomerate, i.e., the larger the precipitate particle becomes with a correlative rapid decrease in corrosion resistance.

The figure illustrates this agglomerating process. The ordinate of the graph represents the diameter of the largest agglomerate particle of $ZrCr_2$ in the sample specified in microns. The abscissa of the graph represents the temperature at which the sample is held and is calibrated in degrees centigrade.

Curve 1 illustrates the change in particle size for the sample of the alloy of this invention when held at any temperature along the curve for a period of 24 hours. Curve 2 illustrates the change in particle size for a sample held at any temperature along the curve for a period of 1 hour. It can be seen from the upward displacement of curve 1 from curve 2 that $ZrCr_2$ particle, i.e., agglomerate, size generally increases as the time the sample is held at any temperature increases. More importantly, it can be seen that agglomerate size increases sharply with temperatures above 800° C. to generally overshadow the effect of time on agglomerate coarsening. For the alloy of the present invention, the critical point occurs at a maximum agglomerate size of approximately 2 microns.

To demonstrate the effect of $ZrCr_2$ agglomerate particle size on corrosion rate, samples of the alloy of this invention were fabricated each having the same composition of zirconium, chromium and iron in accordance with Table I, but differing in particle size of $ZrCr_2$ precipitate agglomerate through fast cooling for a fine agglomerate size and slow cooling for a large agglomerate size. Rapidly cooled samples had $ZrCr_2$ particles of a size generally less than 2 microns in diameter. The slow cooled samples had $ZrCr_2$ particles generally greater than 2 microns in diameter. Table II illustrates the improvement in corrosion rate with decrease in agglomerate size obtained by controlling the method of fabrication.

*Table II*

| Temperature | Corrosion Rate in mg./dm.²/day | |
|---|---|---|
| | Fast Cooled (Fine Agglomerate) | Slow Cooled (Coarse Agglomerate) |
| 500° C | 0.8 | 1.30 |
| 400° C | 0.28 | 0.30 |

To verify the effect of $ZrCr_2$ particle size on corrosion rate the sample having the coarse agglomerate was remelted and processed to obtain a fine agglomerate while the sample having the fine agglomerate was remelted and slow cooled to obtain a coarse agglomerate. The corrosion rate was found to increase for the remelted sample processed to have coarse agglomerate while the corrosion rate was found to decrease for the remelt sample processed to obtain a fine agglomerate. In other words, the sample which formerly had the higher corrosion rate now had the lower corrosion rate while the sample which formerly had the lower corrosion rate was found to have the higher corrosion rate.

The following process when applied to the alloy of this invention has been found to produce a fine agglomerate of $ZrCr_2$ uniformly dispersed in the alloy with the resulting lowest corrosion rate (at the same time giving material of excellent mechanical behavior):

(a) Double vacuum melt.
(b) Forge at 1025° C. At no time allow the material to cool below 900° C. during forging.
(c) After forging, heat soak in furnace at 1050° C. for a period of two hours.
(d) Cool rapidly at a rate faster than 2.5° C. per second.
(E) Extrude, cog, hot roll, swage or the like processing at a temperature not exceeding 780° C.
(f) Anneal before and between cold reductions for approximately 1 hour at 595° C.
(g) Finally anneal for stress relief for approximately two hours at 480° C.

In operating the process of the invention a fissile fuel material, e.g., compact, is enclosed in a fabricated cladding of the alloy of the invention to provide a fuel element. The fuel element is then introduced into a boiling water or other reactor core having a water and/or steam environment provided by the coolant or the like. In the reactor the clad fuel element is subjected to the radiation field of the reactor at temperatures in the range of about 300 to 500° C. while simultaneously being subjected to the steam and/or water therein which steam and/or water includes hydrogen in substantial amounts, e.g., as indicated above. With such operation the cladding remains intact due to the improved hydrogen embrittlement resistance and corrosion resistance of the cladding and accordingly the fissile fuel is protected from deterioration.

Although the foregoing embodiment has been described in detail, there may be other embodiments and variations in configuration which can be made by a person skilled in the art without departing from the spirit, scope or principle of this invention. Therefore, this invention is not to be limited except in accordance with the scope of the appended claims.

What is claimed is:

1. A zirconium based alloy having a high resistance to corrosion in steam and water at 300 to 500° C., high resistance to hydrogen absorption and low susceptibility to hydrogen embrittlement consisting essentially of not more than 2.3 atomic percent chromium with the remainder zirconium wherein at least a portion of said chromium is dispersed as finely divided particles of $ZrCr_2$.

2. A zirconium based alloy as defined in claim 1 wherein said finely divided particles of $ZrCr_2$ are essentially not more than 2.0 microns in diameter.

3. A zirconium based alloy having high resistance to corrosion in steam and water between 300 and 500 degrees C. including high resistance to hydrogen absorption and low susceptibility to hydrogen embrittlement consisting essentially of about 1.7 to 2.3 atomic percent chromium, about 0.1 to 0.2 atomic percent iron with the remainder zirconium wherein at least a portion of said chromium is dispersed as finely divided particles of $ZrCr_2$.

4. A zirconium based alloy as defined in claim 3 wherein said finely divided particles of $ZrCr_2$ are essentially not more than 2.0 microns in diameter.

5. A zirconium based alloy having high resistance to corrosion in steam and water between 300 and 500° C. including high resistance to hydrogen absorption and low susceptibility to hydrogen embrittlement consisting essentially of about 2.0 atomic percent chromium, 0.16 atomic percent iron with a remainder zirconium wherein at least a portion of said chromium is dispersed as finely divided particles of $ZrCr_2$.

6. A zirconium based alloy as defined in claim 5 wherein said finely divided particles of $ZrCr_2$ are essentially not more than 2.0 microns in diameter.

7. A zirconium base alloy having high resistance to corrosion in steam and water between 300 and 500° C.

including high resistance to hydrogen absorption and low susceptibility to hydrogen embrittlement consisting essentially of about 1.7 to 2.3 atomic percent chromium, about 0.1 to 0.2 atomic percent iron with the remainder zirconium.

8. A zirconium base alloy having high resistance to corrosion in steam and water between 300 and 500° C. including high resistance to hydrogen absorption and low susceptibility to hydrogen embrittlement consisting essentially of about 2.0 atomic percent chromium, 0.16 atomic percent of iron with the remainder zirconium.

References Cited by the Examiner
UNITED STATES PATENTS 3,121,666   2/1964   Wheelock _____ 176—54

OTHER REFERENCES

A.E.C. Report NMI-1235, "Corrosion of Zirconium Alloys in 900 and 1000° F. Steam," March 1960, pages 11–13, 75–177.

Weinstein et al.: IITRI–B198–43, Technical Progress Report, July 30, 1963, pages 1 and 33–35.

Weinstein et al.: IITRI–B198–46, Technical Progress Report, Oct. 25, 1963, pages 1 and 11–12.

References Cited by the Applicant

AEC Report GEAP–3979, "Specific Zirconium Alloy Design Program, First Quarterly Progress Report, February–June 1962," July 1, 1962.

AEC Report GEAP–4076, "Specific Zirconium Alloy Design Program, Second Quarterly Progress Report, July–September 1962," Oct. 9, 1962.

AEC Report GEAP–4089, "Proceedings of the USAEC Symposium on Zirconium Alloy Developments," Castlewood, Pleasanton, California, Nov. 30, 1962, volumes I and II.

AEC Report GEAP–4139, "Specific Zirconium Alloy Design Program, Third Quarterly Progress Report, October–December 1962," Jan. 1, 1963.

AEC Report GEAP–4211, "Specific Zirconium Alloy Design Program, Fourth Quarterly Progressive Report, January–March 1963," April 1, 1963.

AEC Report GEAP–4284, "Specific Zirconium Alloy Design Program, Fifth Quarterly Progress Report, April–June 1962," July 1, 1963.

AEC Report GEAP–4368, "Specific Zirconium Alloy Design Program, Quarterly Progress Report No. 6," Oct. 1, 1963.

AEC Report GEAP–4484, "Specific Zirconium Alloy Design Program, Quarterly Progress Report No. 7," Jan. 1, 1964.

Bureau of Mines Report 4658, "A Preliminary Survey of Zirconium Alloys," March 1960.

General Electric Report RL–325, "Development of Zirconium Base Alloys," January 1959.

BEJAMIN R. PADGETT, *Primary Examiner.*

M. J. SCOLNICK, *Assistant Examiner.*